US008838350B2

(12) United States Patent
Inuta

(10) Patent No.: US 8,838,350 B2
(45) Date of Patent: Sep. 16, 2014

(54) AUTOMATIC TRANSMISSION CONTROL DEVICE

(75) Inventor: Yukiyoshi Inuta, Isehara (JP)

(73) Assignees: Jatco Ltd, Fuji-shi (JP); Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 14/004,584

(22) PCT Filed: Mar. 7, 2012

(86) PCT No.: PCT/JP2012/055739
§ 371 (c)(1),
(2), (4) Date: Sep. 11, 2013

(87) PCT Pub. No.: WO2012/132793
PCT Pub. Date: Oct. 4, 2012

(65) Prior Publication Data
US 2014/0005901 A1 Jan. 2, 2014

(30) Foreign Application Priority Data

Mar. 25, 2011 (JP) ................................. 2011-067061

(51) Int. Cl.

| B60W 10/02 | (2006.01) |
|---|---|
| F16H 63/50 | (2006.01) |
| B60W 10/04 | (2006.01) |
| F16H 61/06 | (2006.01) |
| F16H 61/04 | (2006.01) |
| F16H 61/12 | (2010.01) |
| F16H 61/686 | (2006.01) |
| F16H 59/46 | (2006.01) |

(52) U.S. Cl.
CPC ............... *B60W 10/02* (2013.01); *F16H 61/06* (2013.01); *F16H 61/12* (2013.01); *B60W 10/04* (2013.01); *F16H 2063/508* (2013.01); *F16H 61/686* (2013.01); *F16H 2061/064* (2013.01); *F16H 63/50* (2013.01); *F16H 61/04* (2013.01); *F16H 2059/465* (2013.01)
USPC ................................... 701/54; 701/58; 701/64

(58) Field of Classification Search
None
See application file for complete search history.

(56) References Cited

U.S. PATENT DOCUMENTS

| 5,964,675 | A * | 10/1999 | Shimada et al. ............... 475/123 |
|---|---|---|---|
| 7,563,201 | B2 * | 7/2009 | Martin ........................... 477/176 |

FOREIGN PATENT DOCUMENTS

| JP | 06-323423 A | 11/1994 |
|---|---|---|
| JP | 11-201187 A | 7/1999 |
| JP | 2004-286171 A | 10/2004 |
| JP | 2008-025634 A | 2/2008 |

* cited by examiner

*Primary Examiner* — John R Olszewski
*Assistant Examiner* — Jeffrey Boomer
(74) *Attorney, Agent, or Firm* — Foley & Lardner LLP

(57) ABSTRACT

When gear shift to second gear shift stage is completed and frictional engagement element is judged to be in slip state by slip state judging unit in a state in which input torque is input torque upper limit value, a value obtained by subtracting first predetermined amount from the input torque upper limit value is set as a decrease side input torque upper limit value. When next gear shift to the second gear shift stage is completed with the decrease side input torque upper limit value set and the frictional engagement element is not judged to be in slip state by the slip state judging unit in a state in which the input torque is the decrease side input torque upper limit value, a value obtained by adding second predetermined amount to the decrease side input torque upper limit value is set as a new input torque upper limit value.

5 Claims, 4 Drawing Sheets

AUTOMATIC TRANSMISSION CONTROL DEVICE

TECHNICAL FIELD

The present invention relates to a control apparatus of an automatic transmission which achieves a plurality of gear shift stages by combinations of engagement of a plurality of frictional engagement elements.

BACKGROUND ART

In related arts, with regard to an automatic transmission in which one frictional engagement element is engaged in a plurality of different gearshift stages, there is a case where an engagement capacity (torque share) which the one frictional engagement element has differs according to each gear shift stage. Then, if the torque share is designed so as to meet a gear shift stage in which a large engagement capacity is required, there arises a problem that controllability of hydraulic pressure will deteriorate in a gear shift stage in which a small engagement capacity is required.

Thus, a Patent Document 1 discloses a technique in which a clutch of an automatic transmission has a plurality of fluid pressure chambers and a plurality of pistons whose pressure-receiving areas to receive a fluid pressure upon engagement are different from each other, and the fluid pressure chamber that supplies the fluid pressure is changed or switched according to a required engagement capacity.

In the following description, a ratio of the engagement capacity in each gear shift stage is described as a torque share ratio.

CITATION LIST

Patent Document

Patent Document 1: Japanese Patent Provisional Publication Tokkai No. 11-201187

SUMMARY OF THE INVENTION

Technical Problem

However, in a case where the pressure-receiving areas of the pistons are set to be different from each other as disclosed in the Patent Document 1, this has limitations on a corresponding usable torque share ratio. That is, in the case where the pressure-receiving areas are set to be different, it is necessary that the pressure-receiving area of the piston operated, by the fluid pressure of the fluid pressure chamber, in the gear shift stage in which the engagement capacity is small should be set to be smaller than the pressure-receiving area of the piston operated in the gear shift stage in which the engagement capacity is large. In this case, an influence exerted on the controllability by variation in load of a return spring for the piston and a sliding-resistance of a seal member provided at the piston becomes great, and control accuracy tends to decrease. Thus, the case where the pressure-receiving area is set to be small also has limitations.

The present invention was made in view of the above problems, and an object of the present invention is to provide a control apparatus of an automatic transmission which is capable of suppressing the deterioration of the controllability due to the difference of the torque share ratio.

Solution to Problem

To achieve the above object, in the present invention, a control apparatus of a multi-range automatic transmission having a frictional engagement element that is engaged in both of a first gear shift stage and a second gear shift stage, a torque share ratio of the frictional engagement element in the second gear shift stage being greater than a torque share ratio of the frictional engagement element in the first gear shift stage, the multi-range automatic transmission being capable of selecting a plurality of target gear shift stages including the first and second gear shift stages by selectively engaging a plurality of frictional engagement elements including the frictional engagement element, the control apparatus comprises: a slip state judging unit that judges whether or not the frictional engagement element is in a slip state; and an input torque upper limit value setting unit that sets an upper limit value of an input torque inputted to the multi-range automatic transmission. And the input torque upper limit value setting unit sets, as a decrease side input torque upper limit value, a value obtained by subtracting a first predetermined amount from the input torque upper limit value, when a gear shift to the second gear shift stage is completed and also the frictional engagement element is judged to be in the slip state by the slip state judging unit in a state in which the input torque is the input torque upper limit value. And the input torque upper limit value setting unit sets, as a new input torque upper limit value, a value obtained by adding a second predetermined amount to the decrease side input torque upper limit value, when a next gear shift to the second gear shift stage is completed with the decrease side input torque upper limit value set and also the frictional engagement element is not judged to be in the slip state by the slip state judging unit in a state in which the input torque is the decrease side input torque upper limit value.

Effects of the Invention

In this manner, in the second gear shift stage, by increasing the input torque upper limit value by the second predetermined amount after once decreasing the input torque upper limit value by the first predetermined amount, since a proper input torque upper limit value can be set, a safety factor of the engagement capacity of the frictional engagement element can be set to be smaller. Further, since the safety factor can be set to be smaller, hydraulic pressure in the second gear shift stage in which the torque share ratio is great can be decreased, thereby suppressing deterioration of the hydraulic pressure controllability in the first gear shift stage in which the torque share ratio is small.

BRIEF DESCRIPTION OF DRAWINGS

FIG. 1 is a schematic system diagram showing a control apparatus of an automatic transmission according to an embodiment 1.

FIG. 2 is a flow chart showing an input torque upper limit value learning control process according to the embodiment 1.

FIG. 3 is a time chart when decreasing an input torque upper limit value in the input torque upper limit value learning control process of the embodiment 1.

FIG. 4 is a time chart when increasing the input torque upper limit value in the input torque upper limit value learning control process of the embodiment 1.

FIG. 5 is a time chart when holding the input torque upper limit value in the input torque upper limit value learning control process of the embodiment 1.

EMBODIMENTS FOR CARRYING OUT THE INVENTION

Embodiment 1

Figure 1:
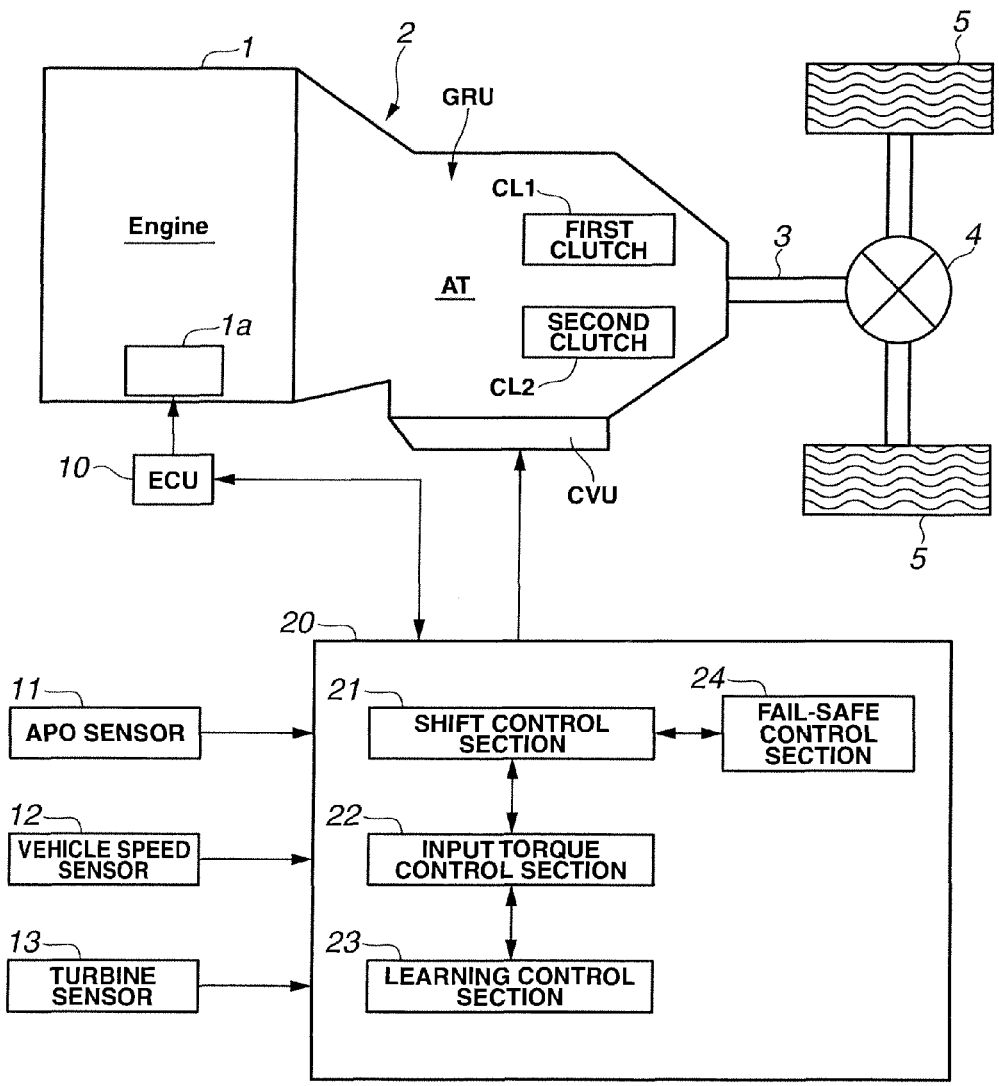
[FIG. 1]

FIG. 1 is a schematic system diagram showing a control apparatus of an automatic transmission according to an embodiment 1. An engine 1 that is a driving source is connected to a multi-range automatic transmission 2 achieving a plurality of gear shift stages, and torque outputted from the multi-range automatic transmission 2 is transmitted to driving wheels 5 from a drive shaft 3 through a differential gear 4. The engine 1 has an engine torque actuator 1a that controls an engine torque by properly controlling a throttle valve opening, a plug ignition timing, a fuel injection amount, etc. The engine torque actuator 1a controls the engine torque on the basis of a command signal of an engine controller 10.

The multi-range automatic transmission 2 has a planetary gear set GRU that is configured by a plurality of frictional engagement elements including a first clutch CL1 and a second clutch CL2, a plurality of rotation members connected to these frictional engagement elements and a plurality of planetary gear sets connected to each rotation member. Further, a control valve unit CVU is provided therein with a plurality of electromagnetic valves that control fluid pressure supplied to each frictional engagement element with an oil pump mounted in the multi-range automatic transmission 2 being a pressure source. The control valve unit CVU supplies a required fluid pressure to the corresponding frictional engagement element according to a command signal of an AT controller 20. More specifically, when a line pressure is set according to driver's required torque, the fluid pressure required for each frictional engagement element is regulated and supplied with this line pressure being a base pressure.

The AT controller 20 has a shift control section 21 that calculates a target gear shift stage on the basis of a traveling condition (such as a vehicle speed and an accelerator pedal opening) and outputs the required command signal to the control valve unit CVU, an input torque control section 22 (corresponding to an input torque upper limit value setting unit) that sets an input torque upper limit value on a torque inputted from the engine 1 and outputs the input torque upper limit value to the engine controller 10, a learning control section 23 (corresponding to the input torque upper limit value setting unit) that, when selecting $n^{th}$ speed, performs a learning control operation of the input torque upper limit value, and a fail-safe control section 24 (corresponding to a fail-safe control performing unit) that, according to a slip state of the frictional engagement element, performs a fail-safe control that shifts a gear shift stage to a gear shift stage in which a slipping frictional engagement element is not used.

The AT controller 20 inputs a signal from an APO sensor 11 that detects the accelerator pedal opening operated by a driver, a signal from a vehicle speed sensor 12 that detects the vehicle speed by detecting a revolution speed of the drive shaft 3 and taking account of a final reduction ratio of the differential gear 4 and a tire diameter of the driving wheel 5 and a signal from a turbine sensor 13 that detects a turbine revolution speed that is an input revolution speed inputted to the multi-range automatic transmission 2. The AT controller 20 then performs each control operation on the basis of these input signals.

Here, in the multi-range automatic transmission 2, when $m^{th}$ speed (corresponding to a first gear shift stage) is set as the target gear shift stage, each of the first clutch CL1 and the second clutch CL2 is engaged. Further, when the $n^{th}$ speed (corresponding to a second gear shift stage) is set as the target gear shift stage, the first clutch CL1 is disengaged, and only the second clutch CL2 is engaged. However, to achieve the $m^{th}$ speed and the $n^{th}$ speed, an arrangement in which the other frictional engagement element is engaged could be possible.

When achieving the $m^{th}$ speed, also when achieving the $n^{th}$ speed, the second clutch CL2 is engaged, and this contributes to torque transmission. When a maximum engagement capacity required of the second clutch CL2 upon achieving the $m^{th}$ speed is M1 and a maximum engagement capacity required of the second clutch CL2 upon achieving the $n^{th}$ speed is N1, the engagement capacity is set so as to establish a relationship of M1<N1. Here, when a ratio between M1 and N1 is a torque share ratio $\alpha x$ (x=m, n), the following expressions can be obtained.

torque share ratio at $m^{th}$ speed: $\alpha m=M1/(M1+N1)$ torque share ratio at $n^{th}$ speed: $\alpha n=N1/(M1+N1)$ That is, the torque share ratio an of the second clutch CL2 at the $n^{th}$ speed is greater than the torque share ratio am of the second clutch CL2 at the $m^{th}$ speed. Therefore, the second clutch CL2 is designed so as to be able to realize an engagement capacity corresponding to the torque share ratio an required at the $n^{th}$ speed.

As described above, with regard to the multi-range automatic transmission 2 of the embodiment 1, the multi-range automatic transmission 2 has the second clutch CL2 that is engaged in both of the different gear shift stages, and the torque share ratio of the second clutch CL2 is different in each gear shift stage. For this reason, there is a need to see to it that no deterioration of the hydraulic pressure controllability occurs even in a gear shift stage in which the torque share ratio is small, while meeting a gear shift stage in which the torque share ratio is large. Normally, when designing the clutch, safety factor is taken into consideration, and an engagement capacity of a value obtained by multiplying a required torque share ratio by, for example, 1.2 is secured. However, if the safety factor is set to be high, the controllability of the hydraulic pressure deteriorates in a gear shift stage in which a small engagement capacity is required.

Thus, in the embodiment 1, the safety factor in the design of the second clutch CL2 is set to be lower than safety factor (e.g. safety factor applied to the other frictional engagement element) required in the normal design. Then, in a case where slip occurs due to shortage of the engagement capacity, by suppressing or controlling an upper limit of the input torque inputted to the multi-range automatic transmission 2, unexpected capacity shortage is solved.

In other words, this is synonymous with a technique that learns an engagement capacity maximum value (a maximum value of transmittable torque) of the second clutch CL2 and limits the input torque so as not to exceed the engagement capacity maximum value.

Here, if the upper limit of the input torque is limited, it is conceivable that this will affect drivability. However, in actual fact, only the torque is limited to an instantaneous level at a time when an accelerator pedal is depressed up to full opening at the $n^{th}$ speed that is a specified gear shift stage. On the contrary, a travelling scene in which the accelerator pedal is gently depressed at the $m^{th}$ speed is more conceivable, and also a required accuracy is high because of a vehicle travelling gently. Thus, the hydraulic pressure controllability of the second clutch CL2 is extremely important. The embodiment 1 has an advantage of responding to this demand without requiring increase of a parts count.

Figure 2:
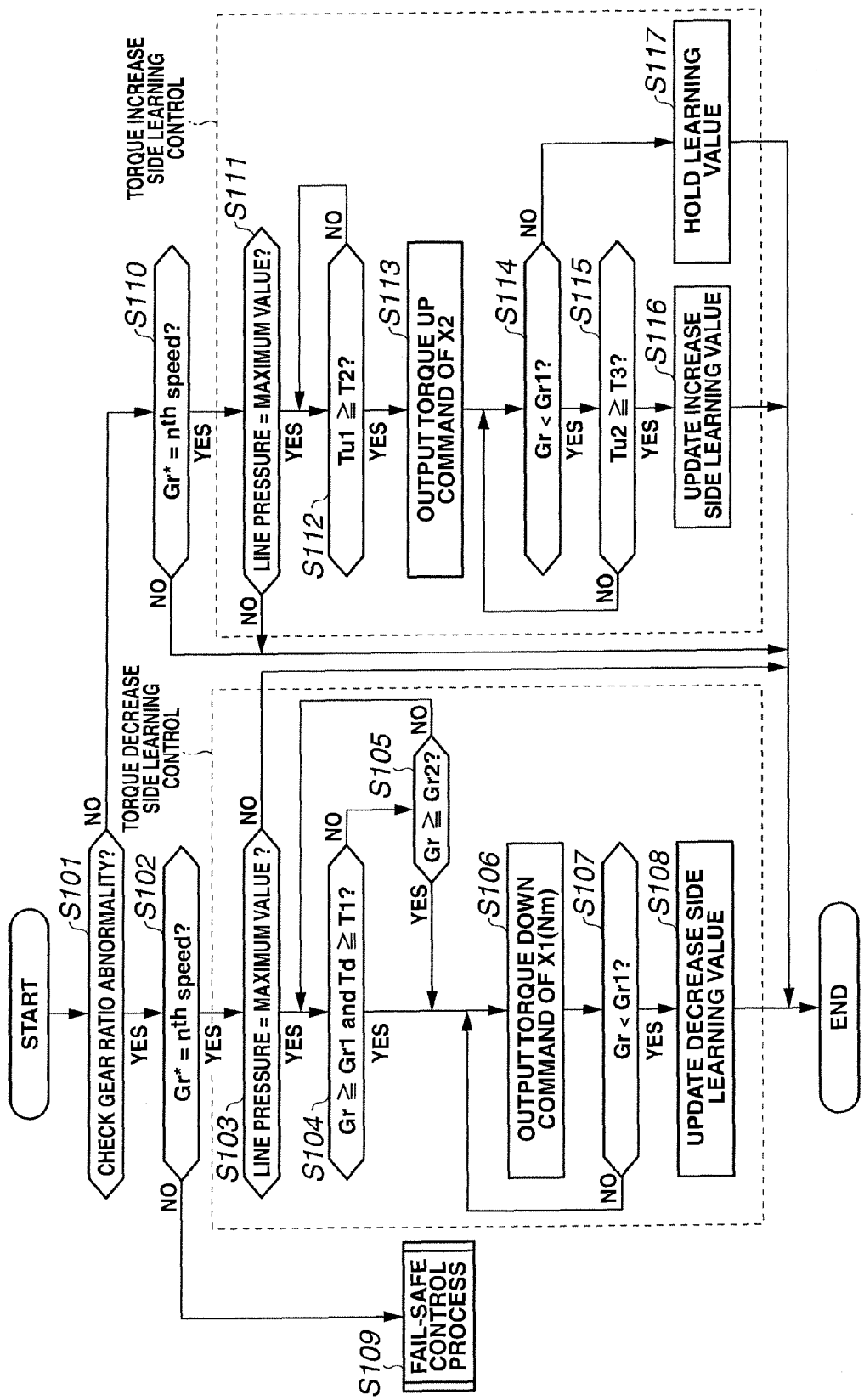
[FIG. 2]

FIG. 2 is a flow chart showing an input torque upper limit value learning control process according to the embodiment 1. This flow chart is a process in which its operation is executed in the learning control section 23, and information updated on the basis of an executed learning result is outputted to the input torque control section 22. This process is not executed during the progress of the gear shift, but is executed in a time period when the gear shift to the setting target gear shift stage has been completed.

At step S101, abnormality in a gear ratio is checked. If the gear ratio abnormality is judged, the routine proceeds to step S102. If the gear ratio is judged to be normal, the routine proceeds to step S110. Here, the check of the gear ratio abnormality is to detect a state in which an actual gear ratio of the multi-range automatic transmission 2 deviates or is shifted from a gear ratio of the target gear shift stage, and this means that the slip due to the shortage of the engagement capacity is occurring at the frictional engagement element required to achieve the target gear shift stage. The actual gear ratio is calculated from an input revolution speed inputted to the multi-range automatic transmission 2 and an output revolution speed outputted from the multi-range automatic transmission 2. More specifically, the input revolution speed inputted to the multi-range automatic transmission 2 is determined by a revolution speed signal of the turbine sensor 13, and the output revolution speed outputted from the multi-range automatic transmission 2 is determined by a revolution speed signal of the vehicle speed sensor 12. Then, the actual gear ratio is calculated by a ratio between both these revolution speeds (i.e. (the input revolution speed/the output revolution speed).

Here, with respect to the detection of this gear ratio abnormality, it is judged by using an abnormality detection first gear ratio Gr1 that is predetermined amount greater than the gear ratio of the target gear shift stage (Gr1 corresponds to a value that deviates or is shifted from the gear ratio of the target gear shift stage by a third predetermined amount) also using an abnormality detection second gear ratio Gr2 that is predetermined amount greater than the abnormality detection first gear ratio Gr1 (Gr2 corresponds to a value that deviates or is shifted from the gear ratio of the target gear shift stage by a fourth predetermined amount that is greater than the third predetermined amount). When a state, in which an actual gear ratio Gr deviates or is shifted to the abnormality detection first gear ratio Gr1 or more and also the actual gear ratio Gr is less than the abnormality detection second gear ratio Gr2, lasts a predetermined first time T1, the gear ratio abnormality is judged. With this judgment, a case where a measure of slip state continues can be judged to be a slip state, then a wrong abnormality judgment is prevented.

Further, when the actual gear ratio Gr is the abnormality detection second gear ratio Gr2 or more, even before lapse of the first time T1, the gear ratio abnormality is immediately judged. With this judgment, the slip occurring at the frictional engagement element is suppressed, thereby increasing durability.

At step S102, a judgment is made as to whether or not a target gear shift stage Gr* is the $n^{th}$ speed. If the target gear shift stage Gr* is the $n^{th}$ speed, the routine proceeds to step S103, and a torque decrease side learning control process is executed. On the other hand, if the target gear shift stage Gr* is a gear shift stage except the $n^{th}$ speed, because the slip state is a slip state of the other frictional engagement element, it is judged that some abnormality occurs, then the routine proceeds to step S109. At step S109, the fail-safe control that performs the gear shift to an avoidance gear shift stage etc. in which the slipping frictional engagement element is not used is carried out. In other words, since the input torque upper limit value learning control process is executed only at the $n^{th}$ speed where the torque share ratio is great, in a case where the slip occurs at the frictional engagement element at the other gear shift stage, a situation in which the vehicle travels with the input torque limited while using the frictional engagement element that is incapable of properly transmitting the torque is prevented, then the vehicle travels using the other normal gear shift stage, thereby securing the drivability.

[Torque Decrease Side Learning Control]

At step S103, a judgment is made as to whether or not the line pressure is a maximum value. If the line pressure is the maximum value, the routine proceeds to step S104. If the line pressure is a value except the maximum value, the present control flow is terminated. That is, the line pressure is a value set according to the driver's required torque etc., and when the driver deeply depresses the accelerator pedal, the engine 1 is also controlled so as to output a large torque (the input torque upper limit value outputted from the input torque control section 22). Thus, by increasing the line pressure up to the maximum value so as to meet this input torque upper limit value, the slip of the frictional engagement element (in this case, it is the second clutch CL2) is prevented.

Regarding the technique of the embodiment 1, since the safety factor is set to be lower, in a case of an input torque in a state in which the line pressure is not increased up to the maximum value, i.e. in a case where the input torque does not reach the input torque upper limit value, the second clutch CL2 is designed so that no slip occurs at the second clutch CL2 even without especially limiting the input torque, then the learning control is not especially required.

However, in a case where the slip still occurs even when the line pressure is increased up to the maximum value in the state in which the input torque increases to the input torque upper limit value, the input torque is required limiting. Thus, when the line pressure is the maximum value, the routine proceeds to steps after step S104, then the learning control process is executed.

At step S104, a count-up of a decrease side abnormality detection timer Td starts. Also, a judgment is made as to whether or not the actual gear ratio Gr is the abnormality detection first gear ratio Gr1 or more and also whether or not its state lasts the first time T1 or more. If judged that the state lasts the first time T1 or more, the routine proceeds to step S106. If judged that the state does not last the first time T1 or more, the routine proceeds to step S105.

At step S105, a judgment is made as to whether or not the actual gear ratio Gr is the abnormality detection second gear ratio Gr2 or more. If the actual gear ratio Gr is the abnormality detection second gear ratio Gr2 or more, the routine proceeds to step S106. If the actual gear ratio Gr is a ratio except the abnormality detection second gear ratio Gr2, the routine returns to step S104, and the count-up of the decrease side abnormality detection timer Td is repeated.

At step S106, a value obtained by subtracting a decrease side predetermined amount X1 from the input torque upper limit value outputted from the input torque control section 22 is set as a decrease side input torque upper limit value, and is outputted to the engine controller 10. With this operation, the torque outputted from the engine 1 becomes a value corresponding to the decrease side input torque upper limit value.

At step S107, a judgment is made as to whether or not the actual gear ratio Gr becomes less than the abnormality detection first gear ratio Gr1. If the actual gear ratio Gr does not become less than the abnormality detection first gear ratio Gr1, this step is repeated until the actual gear ratio Gr becomes less than the abnormality detection first gear ratio Gr1. If judged that the actual gear ratio Gr becomes less than the abnormality detection first gear ratio Gr1, the routine proceeds to step S108. Here, when it is judged that the actual gear ratio Gr does not become less than the abnormality detection first gear ratio Gr1, further torque down by the decrease side predetermined amount X1 could be performed at step S106. Or alternatively, subsequently to waiting for a certain time after the torque down by the amount X1 is performed at one time, the judgment as to whether the actual gear ratio becomes less than the Gr1 might be made. This operation is not especially limited to these manners.

At step S108, since the actual gear ratio converges to the gear ratio of the target gear shift stage by the setting of the decrease side input torque upper limit value, the decrease side input torque upper limit value at this time is updated as the input torque upper limit value for the time being. Consequently, the input torque upper limit value of a case where the gear shift is changed to the $n^{th}$ speed again after the gear shift is changed to the other gear shift stage is the decrease side input torque upper limit value.

At step S110, a judgment is made as to whether or not the target gear shift stage Gr* is the $n^{th}$ speed. If the target gear shift stage Gr* is the $n^{th}$ speed, the routine proceeds to step S111, and a torque increase side learning control process is executed. On the other hand, if the target gear shift stage Gr* is a gear shift stage except the $n^{th}$ speed, since the other frictional engagement element also does not slip and is normal, the present control flow is terminated.

[Torque Increase Side Learning Control]

At step S111, a judgment is made as to whether or not the line pressure is the maximum value. If the line pressure is the maximum value, the routine proceeds to step S112. If the line pressure is a value except the maximum value, the present control flow is terminated. A reason for judging whether the line pressure is the maximum value is the same as that described at step S103, this explanation is thus omitted here.

At step S112, a count-up of a stabilization timer Tu1 starts. Also, a judgment is made as to whether or not a count value of the stabilization timer Tu1 lasts a second time T2 or more. If judged that the count value of the stabilization timer Tu1 lasts the second time T2 or more, the routine proceeds to step S113. If judged that the count value of the stabilization timer Tu1 does not last the second time T2 or more, the count-up of the stabilization timer Tu1 is repeated by repeating this step. That is, upon proceeding to this flow, first, the gear ratio abnormality has not been detected at step S101, thereby deciding that a state in which the gear ratio is normal can be secured after the line pressure becomes the maximum value.

At step S113, a value obtained by adding an increase side predetermined amount X2 to the input torque upper limit value outputted from the input torque control section 22 is set as an increase side input torque upper limit value, and is outputted to the engine controller 10. Here, the increase side predetermined amount X2 is set to a value that is smaller than the decrease side predetermined amount X1. Thus, when the slip is detected, by performing a large torque down, the slip can be avoided immediately, and when the slip is not detected, by performing a small torque up, an occurrence of another slip can be prevented.

At step S114, a judgment is made as to whether or not the actual gear ratio Gr becomes less than the abnormality detection first gear ratio Gr1. If the actual gear ratio Gr does not become less than the abnormality detection first gear ratio Gr1, the routine proceeds to step S117, and the input torque upper limit value is held to a value that is set before adding the increase side predetermined amount X2. On the other hand, if the actual gear ratio Gr becomes less than the abnormality detection first gear ratio Gr1, the routine proceeds to step S115.

At step S115, a count-up of an increase side abnormality detection timer Tu2 starts. Also, a judgment is made as to whether or not the increase side abnormality detection timer Tu2 lasts a third time T3 or more. If judged that the increase side abnormality detection timer Tu2 lasts the third time T3 or more, the routine proceeds to step S116, and the value obtained by adding the increase side predetermined amount X2 is updated as a new input torque upper limit value. On the other hand, if judged that the increase side abnormality detection timer Tu2 does not last the third time T3 or more, the routine returns to step S114, and the count-up of an increase side abnormality detection timer Tu2 is repeated.

[Operation of Input Torque Upper Limit Value Learning Control Process]

Next, an operation of the input torque upper limit value learning control process will be explained.

Figure 3:
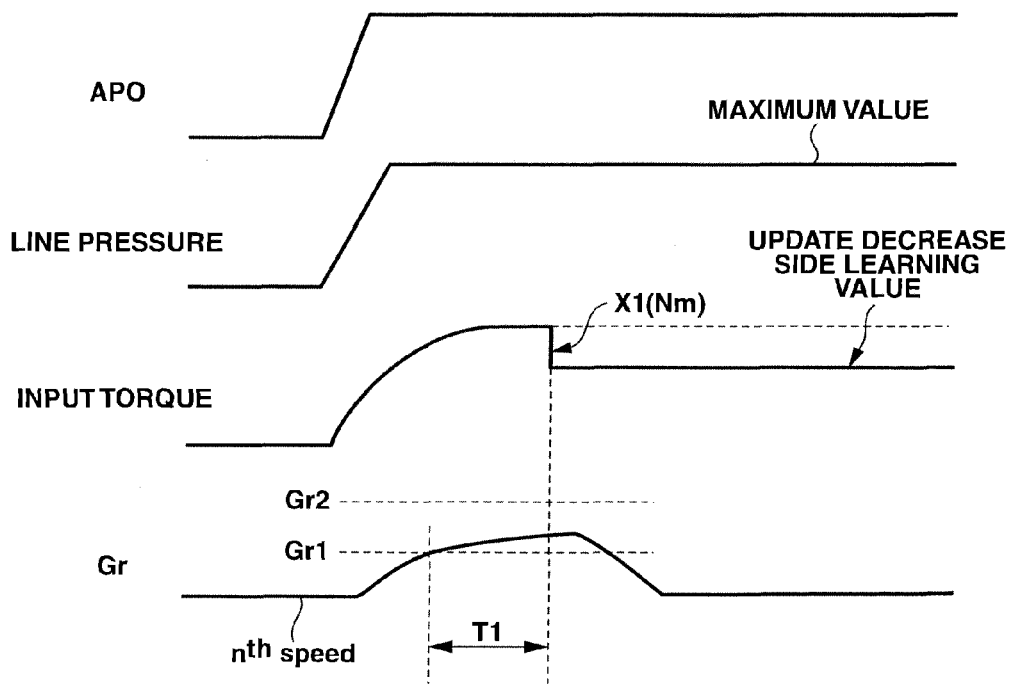
[FIG. 3]

FIG. 3 is a time chart when decreasing the input torque upper limit value in the input torque upper limit value learning control process of the embodiment 1. An initial condition is a state in which the gear shift to the $n^{th}$ speed is completed and the vehicle travels with the accelerator pedal deeply depressed and its accelerator pedal opening kept constant.

When the driver depresses the accelerator pedal, the input torque increases up to the predetermined input torque upper limit value in response to the accelerator pedal depression, and also the line pressure increases up to the maximum value. At this time, when a state, in which the actual gear ratio Gr is the abnormality detection first gear ratio Gr1 or more and also is less than the abnormality detection second gear ratio Gr2, lasts only the first time T1, the decrease side input torque upper limit value that is the value obtained by subtracting the decrease side predetermined amount X1 from the input torque upper limit value is set.

With this setting, since the input torque becomes small, the actual gear ratio Gr converges to the gear ratio of the target gear shift stage (the $n^{th}$ speed). By this operation, it is possible to suppress the occurrence of the slip at the second clutch CL2.

Figure 4:
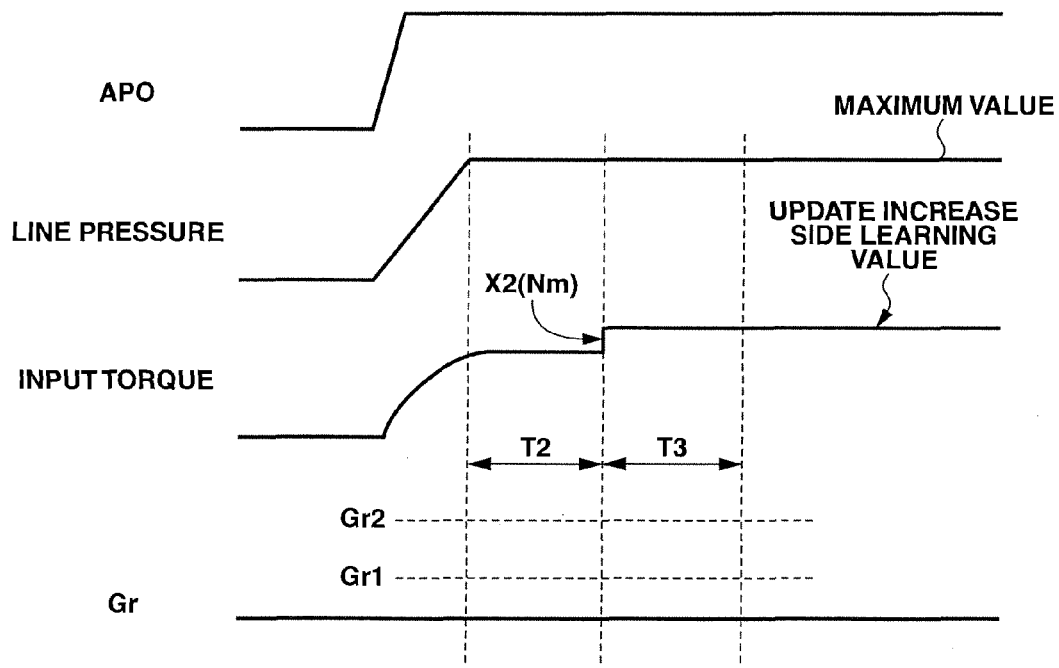
[FIG. 4]

FIG. 4 is a time chart when increasing the input torque upper limit value in the input torque upper limit value learning control process of the embodiment 1. Here, an initial condition of this time chart is a case where after the gear shift is changed to the other gear shift stage in the state in which the input torque upper limit value is once set to the decrease side input torque upper limit value as shown in FIG. 3, the gear shift is changed to the $n^{th}$ speed again.

When the driver depresses the accelerator pedal, the input torque increases up to the decrease side input torque upper limit value in response to the accelerator pedal depression, and also the line pressure increases up to the maximum value. At this time, a state, in which the actual gear ratio Gr is less the abnormality detection first gear ratio Gr1, lasts the second time T2, and a state of the multi-range automatic transmission 2 is stabilized. In this state, the increase side input torque upper limit value that is the value obtained by adding the increase side predetermined amount X2 is set. Subsequently, since the actual gear ratio Gr continuously converges to the gear ratio of the $n^{th}$ speed for the third time T3, this increase side input torque upper limit value is updated as a new input torque upper limit value in the input torque control section 22.

In this manner, by increasing the input torque upper limit value by the amount X2 that is smaller than the amount X1 after once greatly decreasing the input torque upper limit value by the amount X1, while the slip of the second clutch CL2 can be avoided immediately, another slip after increasing the input torque can be suppressed. Further, since a proper input torque upper limit value can be set, as a setting of the safety factor, the safety factor can be reduced to a minimum. Here, since the safety factor can be set to be small, it is possible to suppress deterioration of the hydraulic pressure controllability at the $m^{th}$ speed where the torque share ratio is small.

Figure 5:
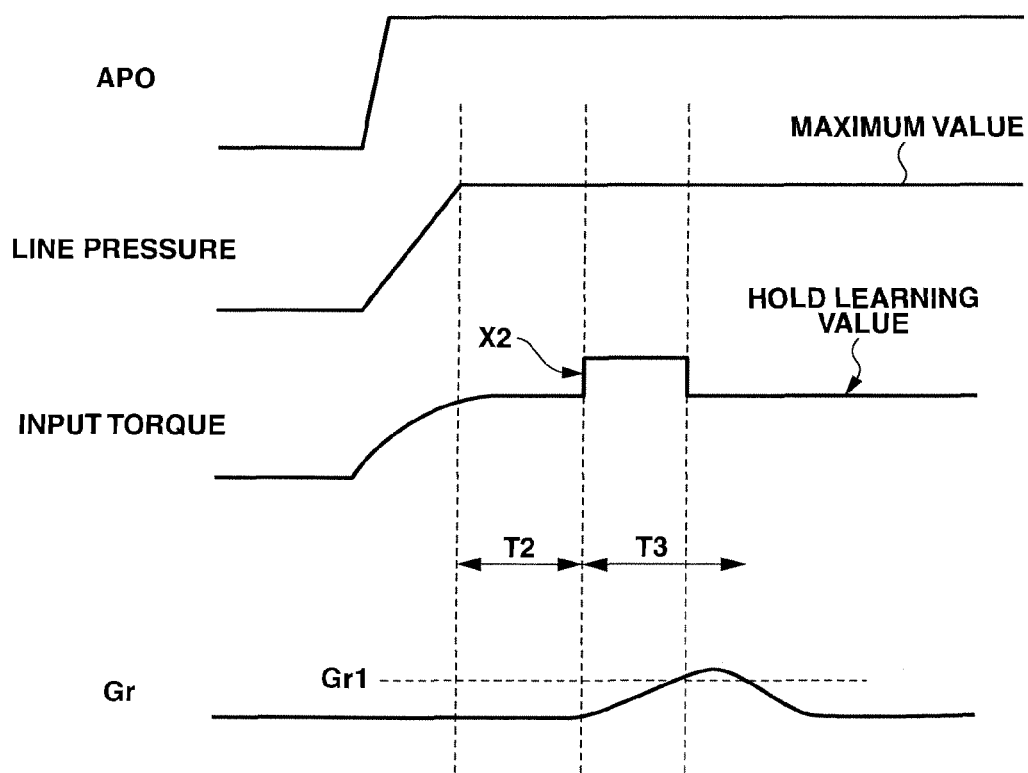
[FIG. 5]

FIG. 5 is a time chart when holding the input torque upper limit value in the input torque upper limit value learning control process of the embodiment 1. Here, an initial condition of this time chart is a case where after the gear shift is changed to the other gear shift stage in the state in which the input torque upper limit value is once set to the decrease side input torque upper limit value as shown in FIG. 3, the gear shift is changed to the $n^{th}$ speed again.

When the driver depresses the accelerator pedal, the input torque increases up to the decrease side input torque upper limit value in response to the accelerator pedal depression, and also the line pressure increases up to the maximum value. At this time, a state, in which the actual gear ratio Gr is less the abnormality detection first gear ratio Gr1, lasts the second time T2, and a state of the multi-range automatic transmission 2 is stabilized. In this state, the increase side input torque upper limit value that is the value obtained by adding the increase side predetermined amount X2 is set. Subsequently, since the actual gear ratio Gr becomes the abnormality detection first gear ratio Gr1 or more before lasting the third time T3 and the slip occurs at the second clutch CL2, by immediately decreasing the input torque upper limit value by the increase side predetermined amount X2, the input torque upper limit value is returned to the decrease side input torque upper limit value. That is, the input torque upper limit value is held.

With this operation, the input torque can be increased up to an utmost possible engagement capacity of the second clutch CL2, thereby setting the safety factor to be smaller.

As explained above, the embodiment 1 has the following operation and effects.
(1) A control apparatus of a multi-range automatic transmission 2 having a second clutch CL2 (a frictional engagement element) that is engaged in both of $m^{th}$ speed (a first gear shift stage) and $n^{th}$ speed (a second gear shift stage), a torque share ratio of the second clutch CL2 in the $n^{th}$ speed being greater than a torque share ratio of the second clutch CL2 in the $m^{th}$ speed, the multi-range automatic transmission 2 being capable of selecting a plurality of target gear shift stages including the $m^{th}$ speed and the $n^{th}$ speed by selectively engaging a plurality of frictional engagement elements including the second clutch CL2, the control apparatus comprises: step S101 (a slip state judging unit) that judges whether or not the frictional engagement element including the second clutch CL2 is in a slip state; and an input torque control section 22 (an input torque upper limit value setting unit) that sets an upper limit value of an input torque inputted to the multi-range automatic transmission 2. And a learning control section 23 sets, as a decrease side input torque upper limit value, a value obtained by subtracting a decrease side predetermined amount X1 (a first predetermined amount) from the input torque upper limit value in steps S106 and S108, when a gear shift to the $n^{th}$ speed is completed and also the second clutch CL2 is judged to be in the slip state by the step S101 in a state in which the input torque is the input torque upper limit value. And the learning control section 23 sets, as a new input torque upper limit value, a value obtained by adding an increase side predetermined amount X2 (a second predetermined amount) to the decrease side input torque upper limit value in steps S113 and S116, when a next gear shift to the $n^{th}$ speed is completed with the decrease side input torque upper limit value set and also the second clutch CL2 is not judged to be in the slip state by the step S101 in a state in which the input torque is the decrease side input torque upper limit value.

In this manner, by increasing the input torque upper limit value by the amount X2 after once decreasing the input torque upper limit value by the amount X1, since a proper input torque upper limit value can be set, a safety factor of the second clutch CL2 can be reduced to a minimum. Further, since the safety factor can be set to be smaller, the hydraulic pressure at the $n^{th}$ speed where the torque share ratio is great can be decreased, thereby suppressing deterioration of the hydraulic pressure controllability at the $m^{th}$ speed where the torque share ratio is small.
(2) When the second clutch CL2 is judged to be in the slip state by the step S101 in a state in which a gear shift stage except the $n^{th}$ speed is selected, the learning control section 23 holds the setting of the input torque upper limit value. Then, a fail-safe control section 24 performs a fail-safe control in which a slipping frictional engagement element is not used.

That is, since the input torque upper limit value learning control process is executed only at the $n^{th}$ speed where the torque share ratio is great, a situation in which the vehicle travels, at the other gear shift stage, with the input torque limited while using the frictional engagement element that is incapable of properly transmitting the torque is prevented, then the vehicle travels using the other normal gear shift stages, thereby securing the drivability.
(3) The increase side predetermined amount X2 is smaller than the decrease side predetermined amount X1.

In this manner, by increasing the input torque upper limit value by the amount X2 that is smaller than the amount X1 after once greatly decreasing the input torque upper limit value by the amount X1, while the slip of the second clutch CL2 can be avoided immediately, another slip can be suppressed.
(4) When a state, in which an actual gear ratio of the multi-range automatic transmission 2 deviates from a gear ratio of the target gear shift stage by an abnormality detection first gear ratio Gr1 or more (Gr1 is a value that is predetermined amount greater than the gear ratio of the target gear shift stage, and Gr1 is a value that deviates or is shifted from the gear ratio of the target gear shift stage by a third predetermined amount), lasts a first time T1 (a predetermined time), the step S101 judges that the second clutch CL2 is in the slip state.

With this judgment, a case where a measure of slip state continues can be judged to be a slip state, then a wrong abnormality judgment is prevented.
(5) When the actual gear ratio of the multi-range automatic transmission 2 deviates from the gear ratio of the target gear shift stage by an abnormality detection second gear ratio Gr2 or more (Gr2 is a value that is predetermined amount greater than the abnormality detection first gear ratio Gr1, and Gr2 is a value that deviates or is shifted from the gear ratio of the target gear shift stage by a fourth predetermined amount that is greater than the third predetermined amount), the step S101 judges that the second clutch CL2 is in the slip state.

That is, when the actual gear ratio Gr is the abnormality detection second gear ratio Gr2 or more, even before lapse of the first time T1, the gear ratio abnormality is immediately judged. With this judgment, the slip occurring at the frictional engagement element is suppressed, thereby increasing durability.

Explanation of Reference

1 . . . engine
1a . . . engine torque actuator
2 . . . multi-range automatic transmission
3 . . . drive shaft
4 . . . differential gear
5 . . . driving wheel
10 . . . engine controller
11 APO sensor
12 . . . vehicle speed sensor
13 . . . turbine sensor
20 . . . AT controller
21 . . . shift control section
22 . . . input torque control section (input torque upper limit value setting unit)
23 . . . learning control section (input torque upper limit value setting unit)
24 . . . fail-safe control section (fail-safe control performing unit)
CL1 . . . first clutch (other frictional engagement element)
CL2 . . . second clutch (frictional engagement element)
CVU . . . control valve unit

The invention claimed is:

1. A control apparatus of a multi-range automatic transmission having a frictional engagement element that is engaged in both of a first gear shift stage and a second gear shift stage, a torque share ratio of the frictional engagement element in the second gear shift stage being greater than a torque share ratio of the frictional engagement element in the first gear shift stage, the multi-range automatic transmission being capable of selecting a plurality of target gear shift stages including the first and second gear shift stages by selectively engaging a plurality of frictional engagement elements including the frictional engagement element, the control apparatus comprising:
 a slip state judging unit that judges whether or not the frictional engagement element is in a slip state; and
 an input torque upper limit value setting unit that sets an upper limit value of an input torque inputted to the multi-range automatic transmission, and
 the input torque upper limit value setting unit setting, as a decrease side input torque upper limit value, a value obtained by subtracting a first predetermined amount from the input torque upper limit value, when a gear shift to the second gear shift stage is completed and also the frictional engagement element is judged to be in the slip state by the slip state judging unit in a state in which the input torque is the input torque upper limit value, and
 the input torque upper limit value setting unit setting, as a new input torque upper limit value, a value obtained by adding a second predetermined amount to the decrease side input torque upper limit value, when a next gear shift to the second gear shift stage is completed with the decrease side input torque upper limit value set and also the frictional engagement element is not judged to be in the slip state by the slip state judging unit in a state in which the input torque is the decrease side input torque upper limit value.

2. The control apparatus of the multi-range automatic transmission as claimed in claim 1, further comprising:
 a fail-safe control performing unit that, when the frictional engagement element is judged to be in the slip state by the slip state judging unit, performs a fail-safe control in which the frictional engagement element is not used, and when the frictional engagement element is judged to be in the slip state by the slip state judging unit in a state in which the second gear shift stage is selected, does not perform the fail-safe control, and wherein
 when the frictional engagement element is judged to be in the slip state by the slip state judging unit in a state in which a gear shift stage except the second gear shift stage is selected, the input torque upper limit value setting unit holds the setting of the input torque upper limit value, and
 the fail-safe control performing unit performs the fail-safe control in which the frictional engagement element is not used.

3. The control apparatus of the multi-range automatic transmission as claimed in claim 1, wherein:
 the second predetermined amount is smaller than the first predetermined amount.

4. The control apparatus of the multi-range automatic transmission as claimed in claim 1, wherein:
 when a state, in which an actual gear ratio of the multi-range automatic transmission deviates from a gear ratio of the target gear shift stage by a third predetermined amount or more, lasts a predetermined time, the slip state judging unit judges that the frictional engagement element is in the slip state.

5. The control apparatus of the multi-range automatic transmission as claimed in claim 4, wherein:
 when the actual gear ratio of the multi-range automatic transmission deviates from the gear ratio of the target gear shift stage by a fourth predetermined amount, which is greater than the third predetermined amount, or more, the slip state judging unit judges that the frictional engagement element is in the slip state.

* * * * *